3 Sheets—Sheet 1.

L. THIERRY & G. B. HILL.
MACHINE FOR MAKING HOT PRESSED NUTS.

No. 66,414. Patented July 2, 1867.

Witnesses:
Thos Fuschi
J. A. Service

Inventor:
Lewis Thierry
Geo. B. Hill
Per Munn & Co.

L. THIERRY & G. B. HILL.
MACHINE FOR MAKING HOT PRESSED NUTS.

No. 66,414. Patented July 2, 1867.

Witnesses:
Thos Fusche
J. A. Service

Inventor:
Lewis Thierry
Geo B Hill
Per Munn & Co

3 Sheets—Sheet 3.

L. THIERRY & G. B. HILL.
MACHINE FOR MAKING HOT PRESSED NUTS.

No. 66,414. Patented July 2, 1867.

Witnesses:
Thos Fusche
J. A. Service

Inventor:
Lewis Thierry
Geo. B. Hill
Per Munn

United States Patent Office.

LEWIS THIERRY AND GEORGE B. HILL, OF DETROIT, MICHIGAN.

Letters Patent No. 66.414, dated July 2, 1867.

IMPROVED MACHINE FOR MAKING HOT-PRESSED NUTS.

The Schedule referred to in these Letters Patent and making part of the same.

TO ALL WHOM IT MAY CONCERN:

Be it known that we, LEWIS THIERRY and GEORGE B. HILL, of Detroit, in the county of Wayne, and State of Michigan, have invented a new and useful improvement in Machinery for Making Hot-Pressed Nuts; and we do hereby declare that the following is a full, clear, and exact description thereof, which will enable others skilled in the art to make and use the same, reference being had to the accompanying drawings, forming part of this specification, in which—

Figure 1:
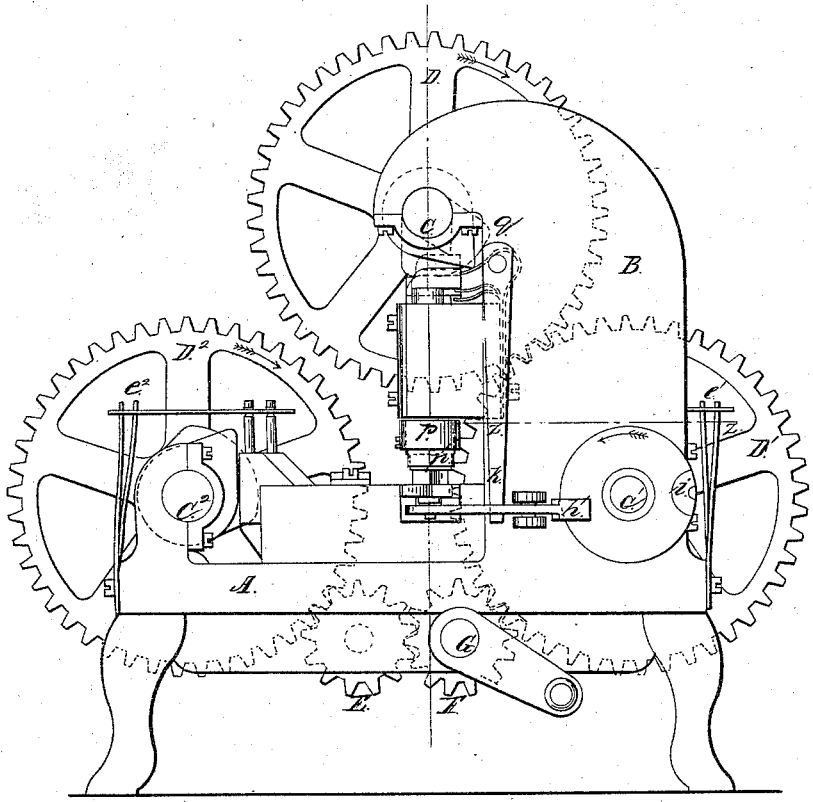
Figure 2:
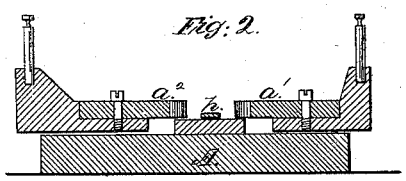
Figure 3:
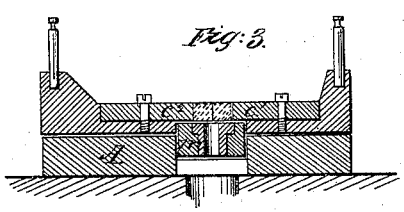
Figure 4:
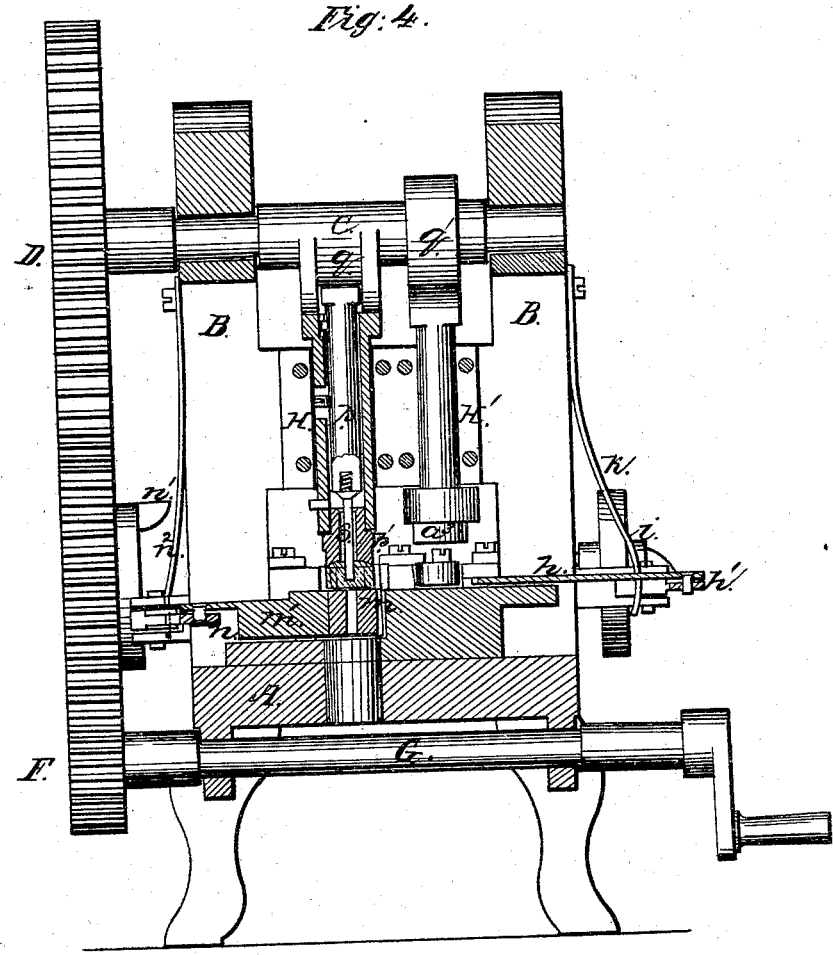
Figure 5:
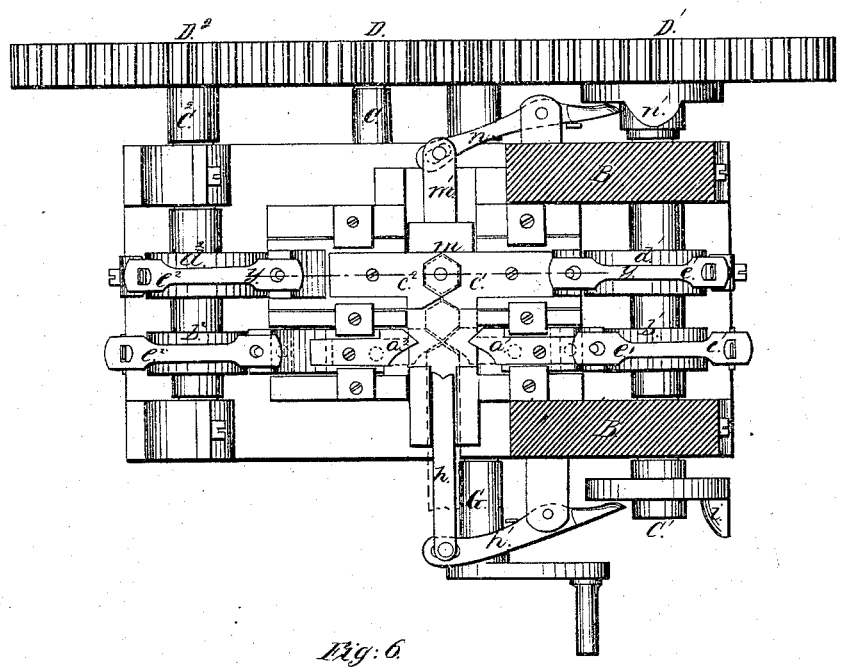
Figure 6:
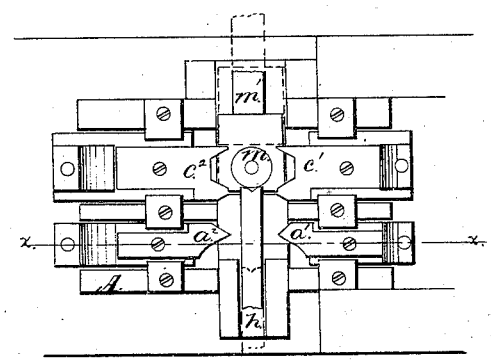
Figure 7:
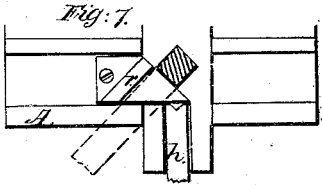

Figure 1, Sheet 1, is a front elevation of an improved machine for making hot-pressed nuts.
Figure 2, a vertical longitudinal section taken on the line $x\,x$, fig. 6.
Figure 3, a vertical longitudinal section taken in the line $y\,y$, fig. 5.
Figure 4, Sheet 2, a vertical transverse section taken in the plane of the line $x\,x$, fig. 1.
Figure 5, Sheet 3, a plan with the standards B B cut off, in the line $z\,z$, fig. 1.
Figure 6, a partial plan.
Figure 7, a detail showing the guide-block arrangement for cutting square nuts.
Similar letters of reference indicate like parts.

This invention relates to improvements in machinery for the manufacture of hot-pressed nuts, and consists of devices for cutting from the heated iron bar hexagonal, octagonal, or quadrilateral blanks, and by an automatic slide moving the blanks over a die and under a punch, which punches out the centre hole for the screw, the whole operation of cutting off the blanks and punching the holes being continuous, and performed with great rapidity, allowing a whole bar of heated iron to be fed into the machine and converted into blank nuts without intermission or a second heating, and without waste of material, except the core from the hole.

A is a strong cast-iron frame or bed, resting on suitable supports, at one end of which are heavy standards, B B, placed on opposite sides of the bed-plate. $C\ C^1\ C^2$ are three shafts, in gear connection with each other by the spur-wheels $D\ D^1\ D^2$ on their ends respectively, and the intermediate pinion E, receiving their motion from the pinion F, on the driving-shaft G. The shafts $C^1\ C^2$, placed across opposite ends of the bed A, operate right and left slides, working to a central transverse line, with V-pointed steel cutters, and with clamps constructed alike, and facing each other, operated simultaneously by cams on the shafts $C^1\ C^2$, for the purpose of cutting off the nuts from the bar of iron, and clamping them while they are punched. The cutters $a^1\ a^2$ are actuated by the cams $b^1\ b^2$, and the clamps $c^1\ c^2$ by the cams $d^1\ d^2$ on the shafts $C^1\ C^2$ respectively. The cams push them forward horizontally to the work, and the springs $e^1\ e^2$ are connected with them, respectively, for drawing them back after performing their work. But this retrograde movement of the cutters and the clamps may be effected by other devices than springs more positively, and they are employed merely to exhibit the mode of their operation. A horizontal slide-bar, $h$, works across the bed of the machine from the front side, by means of a side lever, $h^1$, attached to it at one end and operated on at the other end by a side cam, $i$, placed on the front end of the shaft $C^1$. A spring, $k$, throws the lever back, and withdraws the slide after it has carried forward a nut, which has been cut by the cutters $a^1\ a^2$ to place it upon the die $m$, to be punched as hereinafter described. The die $m$ is connected by the arm $m^1$ with one end of a side lever, $n$, the other end of which lever is moved by a side cam, $n^1$, on the shaft $C^1$, inside of the spur-wheel $D^1$, for drawing the die $m$ out to discharge the nut after the hole has been punched in it, and a spring, $n^2$, acts on the lever $n$ to push the die $m$ back to its place to receive another blank nut ready for punching. Directly over the die $m$ is a hollow plunger, $p$, which works vertically in the box H, for the purpose of clamping the nut on the die $m$, and holding it while it is punched by a round punch, $s$, that works inside of the hollow plunger. On the lower end of the hollow plunger $p$ is a cupped block, $p'$, for the purpose of bevelling the top of the nut. The hollow plunger $p$ and the interior punch $s$ are worked simultaneously by a double-faced cam, $q$, placed above on the shaft C, which cam operates in such manner that the plunger first moves down and clamps upon the nut as it lies on the die $m$, to give the impression with the cup at the bottom, to bevel the nut, while the punch follows immediately after, and punches out the core in the nut through the die $m$; and on the return movement the plunger continues to hold the nut while the punch is withdrawn from it. The die $m$ is drawn from under the bottom of the plunger $p$, while it still bears upon it slightly, and thus cuts off the bur formed on the lower side of the hole in the nut when punched, and as soon as the die $m$ withdraws, the punched blank falls through the bed.

The operation of the machine is as follows, to wit: When the machine is in motion the end of a bar of hot iron is introduced over the sliding-bar $h$, and is pushed in until the end strikes the clamps $c^1 c^2$, while they are closed, so that they act as a gauge for the nut when cut off by the cutters $a^1 a^2$, which are moved up instantly by the cams $b^1 b^2$ on the shafts $C^1 C^2$. As soon as the blank nut is cut off the slide-bar $h$ moves up and pushes the blank forward upon the die $m$, which takes its place under the plunger $p$ at the same time, while also the clamps $c^1 c^2$ recede simultaneously to allow the slide $h$ to push the blank upon the die $m$, the several parts being operated by their respective cams, as hereinbefore described. The moment the blank is placed on the die $m$, the plunger $p$ comes down, and the cup $p'$ bears upon the blank and bevels its upper side, while, by a simultaneous movement, the clamps $c^1 c^2$ move up to the nut and hold it firmly in place; then the punch $s$ descends and punches out the hole in the blank nut. The same operation before described is repeated by pushing up the bar of iron against the clamps $c^1 c^2$, while they are in this position, and so soon as the hole is punched in the blank nut, the punch $s$ rises, and the cup $p'$ releases the nut sufficiently to allow the die $m$ to be drawn back by the cam $n^1$ to cut off the bur on the under side, and let the finished nut drop through an opening in the bed-plate.

Having described our invention and its operation, we do claim as new, and desire to secure by Letters Patent—

The combination of the die, clamps, cutters, slides, hollow plungers, and centre punch, or equivalents, constructed and arranged substantially as described.

LEWIS THIERRY,
GEO. B. HILL.

Witnesses:
JOSEPH KUHN,
PETER G. KOCH.